(12) United States Patent
Zhou et al.

(10) Patent No.: US 12,339,726 B2
(45) Date of Patent: Jun. 24, 2025

(54) METHOD FOR SYSTEM SWITCHING, WEARABLE DEVICE, AND STORAGE MEDIUM

(71) Applicant: GUANGDONG OPPO MOBILE TELECOMMUNICATIONS CORP., LTD., Guangdong (CN)

(72) Inventors: Libin Zhou, Guangdong (CN); Liang Wang, Guangdong (CN); Shun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 62 days.

(21) Appl. No.: 18/336,174

(22) Filed: Jun. 16, 2023

(65) Prior Publication Data
US 2023/0324974 A1   Oct. 12, 2023

Related U.S. Application Data

(63) Continuation of application No. PCT/CN2021/124766, filed on Oct. 19, 2021.

(30) Foreign Application Priority Data

Dec. 18, 2020   (CN) .......................... 202011506224.1
Apr. 15, 2021   (CN) .......................... 202110406970.1

(51) Int. Cl.
*G06F 1/00*     (2006.01)
*G06F 1/3228*   (2019.01)
(Continued)

(52) U.S. Cl.
CPC .......... *G06F 1/3228* (2013.01); *G06F 1/3293* (2013.01); *G06F 1/3203* (2013.01)

(58) Field of Classification Search
CPC ................. G06F 1/3228; G06F 1/3293; G06F 2209/483; G06F 9/485; G06F 2009/4557;
(Continued)

(56) References Cited

U.S. PATENT DOCUMENTS

| 11,669,235 B2* | 6/2023 | Crowley | .................. G06F 1/14 715/771 |
| 2006/0136756 A1* | 6/2006 | Rothman | .............. G06F 1/3203 713/300 |

(Continued)

FOREIGN PATENT DOCUMENTS

| CN | 102104936 | 11/2014 |
| CN | 104424028 | 3/2015 |

(Continued)

OTHER PUBLICATIONS

CNIPA, First Office Action for CN Application No. 202110406970.1, Oct. 7, 2023.
(Continued)

*Primary Examiner* — Volvick Derose
(74) *Attorney, Agent, or Firm* — Hodgson Russ LLP

(57) ABSTRACT

A method for system switching, a wearable device, and a storage medium are provided. The method is performed by a wearable device at least equipped with a first processor and a second processor. The second processor has higher power consumption than the first processor. The first processor is configured to run a first system, and the second processor is configured to run a second system. The method includes the following. A first event is processed with the first system when the second processor is in a dormant state. In response to a second event being triggered and the first processor failing to meet a processing capacity required for the second event, the second processor is switched to a wake-up state, and the second event is processed with the second system.

20 Claims, 11 Drawing Sheets

Processing a first event with a first system when a second processor is in a dormant state, where the first system is a system run by a first processor — 301

In response to a second event triggered, switching the second processor to a wake-up state and processing the second event with a second system, where the second system is a system run by the second processor, and the first processor fails to meet a processing capacity required for the second event — 302

(51) Int. Cl.
*G06F 1/3293* (2019.01)
*G06F 1/3203* (2019.01)

(58) Field of Classification Search
CPC .... G06F 9/45558; G06F 9/441; G06F 9/4418; G06F 9/451
USPC ........................................................ 713/323
See application file for complete search history.

(56) References Cited

U.S. PATENT DOCUMENTS

| | | | | |
|---|---|---|---|---|
| 2009/0259863 | A1* | 10/2009 | Williams | G06F 1/3203 713/323 |
| 2012/0260084 | A1* | 10/2012 | Li | G06F 11/2028 713/100 |
| 2013/0125126 | A1* | 5/2013 | Yokota | G06F 9/48 718/102 |
| 2013/0151840 | A1* | 6/2013 | Kanigicherla | G06F 9/461 710/305 |
| 2014/0068297 | A1* | 3/2014 | An | G06F 1/3206 713/320 |
| 2014/0181560 | A1* | 6/2014 | Muralidhar | G06F 1/3287 713/323 |
| 2016/0055031 | A1 | 2/2016 | Tu et al. | |
| 2017/0161507 | A1* | 6/2017 | Wang | G06F 21/57 |
| 2017/0244644 | A1* | 8/2017 | Lee | H04L 47/32 |
| 2023/0047724 | A1* | 2/2023 | Le | H04W 4/06 |

FOREIGN PATENT DOCUMENTS

| | | | | |
|---|---|---|---|---|
| CN | 105204931 | | 12/2015 | |
| CN | 106484075 | | 3/2017 | |
| CN | 104216777 | | 9/2017 | |
| CN | 108319360 | | 7/2018 | |
| CN | 110223691 | | 9/2019 | |
| CN | 110908496 | | 3/2020 | |
| CN | 110908496 A | * | 3/2020 | ........... G06F 1/3243 |
| CN | 111142651 | | 5/2020 | |
| CN | 111781616 | | 10/2020 | |
| CN | 111781616 A | * | 10/2020 | ............. G01S 19/34 |
| CN | 111951921 | | 11/2020 | |
| WO | 2012152202 | | 11/2012 | |

OTHER PUBLICATIONS

WIPO, International Search Report and Written Opinion for International Application No. PCT/CN2021/124766, Jan. 19, 2022.
EPO, Extended European Search Report for EP Application No. 21905270.1, Apr. 16, 2024.

* cited by examiner

METHOD FOR SYSTEM SWITCHING, WEARABLE DEVICE, AND STORAGE MEDIUM

CROSS-REFERENCE TO RELATED APPLICATION(S)

This application is a continuation of International Application No. PCT/CN2021/124766, filed Oct. 19, 2021, which claims priority to Chinese Patent Application No. 202011506224.1, filed Dec. 18, 2020, and priority to Chinese Patent Application No. 202110406970.1, filed Apr. 15, 2021. The entire disclosures of the aforementioned applications are incorporated herein by reference.

TECHNICAL FIELD

This application relates to the field of wearable devices, and particularly to a method for system switching, a wearable device, and a storage medium.

BACKGROUND

A wearable device is a portable electronic device that can be worn directly or integrated into clothes or accessories. Common wearable devices may include smart watches, smart bracelets, smart glasses, etc.

For the sake of portability and wearability, the wearable device is generally designed to have a relatively small size, and the relatively small size means that the wearable device can only be equipped with a battery with a relatively small capacity, which leads to a short battery life of the wearable device, as a result, a user needs to charge the wearable device frequently.

SUMMARY

Implementations of the disclosure provide a method for system switching. The method is performed by a wearable device. The wearable device is at least equipped with a first processor and a second processor. The second processor has higher power consumption than the first processor. The first processor is configured to run a first system, and the second processor is configured to run a second system. The method includes the following. A first event is processed with the first system when the second processor is in a dormant state. In response to a second event being triggered and the first processor failing to meet a processing capacity required for the second event, the second processor is switched to a wake-up state and the second event is processed with the second system.

Implementations of the disclosure provide a wearable device. The wearable device includes a processor and a memory. The processor at least includes a first processor configured to run a first system and a second processor configured to run a second system. The second processor has higher power consumption than the first processor. The memory is coupled with the processor, and stores at least one instruction. The at least one instruction, when executed by the processor, is operable with the wearable device to execute the above method for system switching.

Implementations of the disclosure provide a non-transitory computer-readable storage medium. The non-transitory computer-readable storage medium stores at least one instruction which, when executed by a processor of a wearable device at least including a first processor configured to run a first system and a second processor configured to run a second system, causes the wearable device to execute the above method for system switching.

Other features and aspects of the disclosed features will become apparent from the following detailed description, taken in conjunction with the accompanying drawings, which illustrate, by way of example, the features in accordance with implementations of the disclosure. The summary is not intended to limit the scope of any implementations described herein.

DETAILED DESCRIPTION

Figure 1:
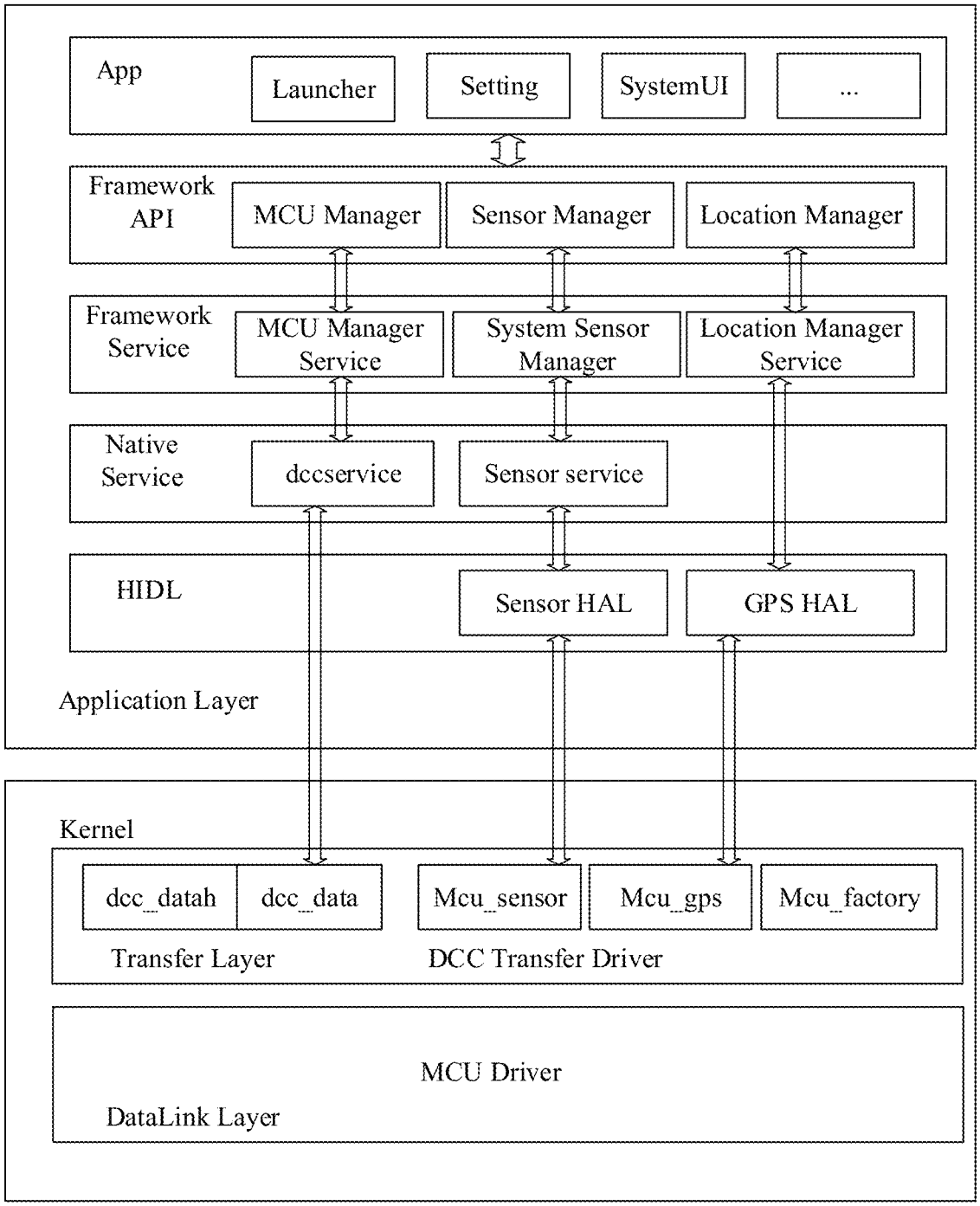
FIG. 1 is a schematic diagram illustrating a dual-core communication software framework corresponding to a second processor provided in an exemplary implementation of the disclosure.

In order to make objects, technical solutions, and advantages of the disclosure clearer, implementations of the disclosure will be further described in detail below with reference to accompanying drawings.

The term "a plurality of/multiple" herein means two or more than two. The term "and/or" is used to describe the association of associated objects and indicates that there can be three relationships. For example, "A and/or B" may indicate: A exists alone, A and B exist simultaneously, and B exists alone. The character "/" generally indicates that associated objects before and after the character are in an "OR" relationship.

In related technologies, a wearable device is equipped with a single processor, and all system events generated during operation of the wearable device are processed with an operating system running on the processor, and thus, the processor needs to have strong data processing capabilities and needs to remain in a working state during operation of the wearable device. However, in daily use, the wearable device only needs to implement some functions with a low processing-performance requirement in most cases. As an example, for a smart watch or smart bracelet, the smart watch or smart bracelet only needs to display time and prompt messages in most cases. Therefore, keeping the processor in the working state for a long time will not improve performance of the wearable device, but will increase power consumption of the wearable device, resulting in a short battery life of the wearable device.

In order to reduce the power consumption of the wearable device while ensuring the performance of the wearable device, in implementations of the disclosure, the wearable device is at least equipped with a first processor and a second processor which have different processing performance and power consumption, the first processor and the second processor are used to run a first system and a second system (i.e., dual-core dual-system) respectively, and a system switching mechanism is designed for the dual-core dual-system.

During operation of the wearable device, an event with a low-performance processing requirement is processed with a first system running on a low power-consumption processor, and a high power-consumption processor is kept in a dormant state (accordingly, a second system run by the high power-consumption processor is in the dormant state), which can reduce the power consumption of the wearable device while realizing basic functions of the wearable device. When there is an event with a high-performance processing requirement, the high power-consumption processor is woken up, and the event is processed by switching to the second system, to ensure that the triggered event can be responded and processed in time and meet the performance requirement of the wearable device. By adopting solutions of implementations of the disclosure, the wearable device can automatically switch between systems according to a processing capability required for the triggered event and processing capabilities of different processors, which can reduce the power consumption of the wearable device while ensuring the performance of the wearable device.

In implementations of the disclosure, since the first processor and the second processor work asynchronously, in order to ensure data consistency between different systems, the first system and the second system need to implement system communication (or called dual-core communication). In a possible application scenario, the first system is a real time operating system (RTOS) running on a micro controller unit (MCU), and the second system is an Android® operating system running on a central processing unit (CPU).

As illustrated in FIG. 1, FIG. 1 illustrates a dual-core communication software framework of an Android® operating system provided in an exemplary implementation of the disclosure. The dual-core communication software framework follows a design principle of "low coupling, high reliability, and high reuse", and includes development of kernel module, hardware abstraction layer (HAL) interface definition language (HIDL) module, native service module, framework service module, framework application programming interface (API) module, and application (APP) module.

The APP module includes functional modules such as launcher, setting, and system user interface (SystemUI). The framework API module includes management modules such as MCU manager, sensor manager, location manager, etc. The framework service module includes service modules such as MCU manager service, system sensor manager, location manager service, etc. The native service module includes service modules such as dcc service, sensor service, etc. The HIDL module includes modules such as sensor HAL, global positioning system (GPS) HAL, etc. The kernel module includes DCC transfer drivers such as dcc_datah, dcc_data, Mcu_sensor, Mcu_gps, and Mcu_factory.

A transfer layer, as an interface layer connecting higher layers and lower layers in the dual-core communication software framework, can shield transmission details of communication of the lower layer (e.g., DataLink layer) of the system for an application layer, and provide service channels for application scenarios. The application layer, as a service provider, can respond to human-computer interaction, transfer data generated during the human-computer interaction through the transfer layer, and respond to an external data request.

Figure 2:
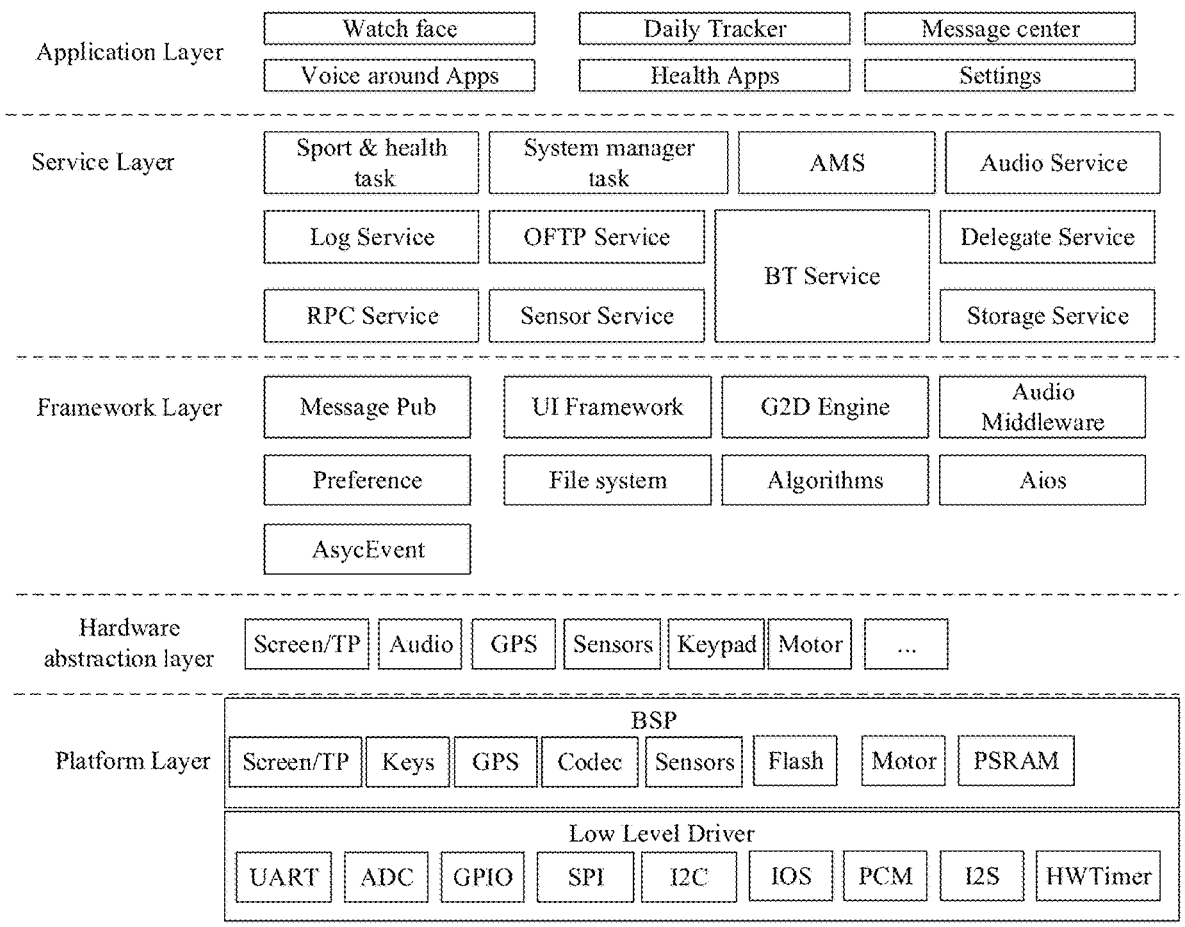
FIG. 2 is a schematic diagram illustrating a dual-core communication software framework corresponding to a first processor provided in an exemplary implementation of the disclosure.

The RTOS is designed according to a peer-to-peer principle. Taking a smart watch as an example of the wearable device, as illustrated in FIG. 2, FIG. 2 illustrates a dual-core communication software framework of an RTOS provided in an exemplary implementation of the disclosure.

The dual-core communication software framework of the RTOS is divided into an application layer, a service layer, a framework layer, an HAL, and a platform layer.

The application layer includes application modules such as watch face, daily tracker, message center, voice around Apps, health Apps, and settings. The service layer includes service modules such as sport & health task, system manager task, activity management service (AMS), audio service, log service, Odette file transfer protocol (OFTP) service, Bluetooth (BT) service, delegate service, remote procedure call (RPC) service, sensor service, and storage service. The framework layer includes framework modules such as message pub, user interface (UI) framework, genesis2D (G2D) engine, audio middleware, preference, file system, algorithms, Aios, and AsycEvent. The HAL includes hardware abstraction modules such as screen/touch panel (TP), audio, GPS, sensors, keypad, and motor. The platform layer includes board support package (BSP) and low level driver, where the BSP includes screen/TP, keys, GPS, codec, sensors, flash, motor, pseudo-static random access memory (PSRAM), etc., and the low level driver includes a universal asynchronous receiver/transmitter (UART), an analog-to-digital converter (ADC), general-purpose input and output (GPIO), a serial peripheral interface (SPI), an inter-integrated circuit (I2C), an input output system (IOS), pulse code modulation (PCM), an inter-IC sound (I2S), hardware timer (HWTimer), etc.

It is to be noted that, the above dual-core communication software framework is only for schematic illustration, those skilled in the art can also add, delete, or modify the framework according to actual needs, and the specific structure of the dual-core communication software framework is not limited in implementations of the disclosure.

The method for system switching of implementations of the disclosure can be performed by a wearable device. The wearable device is at least equipped with a first processor and a second processor. Power consumption of the second processor is higher than that of the first processor. The first processor is configured to run a first system, and the second processor is configured to run a second system. The method includes the following. When the second processor is in a dormant state, a first event is processed with the first system. In response to a second event being triggered and the first processor failing to meet a processing capacity required for the second event, the second processor is switched to a wake-up state and the second event is processed with the second system.

Optionally, the second event is processed with the second system as follows. A first switch instruction is sent to the first system with the second system. A graphical user interface (GUI) display permission is transferred with the first system to the second system in response to the first switch instruction. The second event is processed with the second system, and a GUI corresponding to the second event is displayed.

Optionally, the second event is processed with the second system as follows. Event data of the second event is sent to the second system with the first system. The event data is processed with the second system to obtain event feedback data. The event feedback data sent by the second system is received with the first system, and a GUI corresponding to the second event is displayed according to the event feedback data.

Optionally, after the second event is processed with the second system, the method further includes the following. In response to completion of processing of the second event, the second processor is switched to the dormant state.

Optionally, the second system has a GUI display permission in a process of processing the second event. Before the second processor is switched to the dormant state, the method further includes the following. A second switch instruction is sent to the first system with the second system. The GUI display permission is obtained with the first system from the second system in response to the second switch instruction.

Optionally, the method further includes the following. When the second processor is in the dormant state, first data is cached with the first system, where the first data is cached in a data storage space corresponding to the first system. After the second processor is switched to the wake-up state, the method further includes the following. When the second processor is in the wake-up state, the first data is synchronized to the second system with the first system.

Optionally, synchronizing the first data to the second system with the first system includes: binding, according to a data type of the first data, a data synchronization service through a data communication service provided by the second system, where different data types correspond to different data synchronization services; and synchronizing the first data to a target application in the second system through the data synchronization service bound, where the target application is used to process the first data.

Optionally, synchronizing the first data to the second system with the first system further includes: synchronizing target data in the first data to the second system with the first system, where a data volume of the target data is less than a data-volume threshold.

Optionally, after the first data is cached with the first system, the method further includes the following. In response to a data volume of the first data cached reaching a storage-capacity threshold, the second processor is switched to the wake-up state and the first data is synchronized to the second system with the first system.

Optionally, after the first data is cached with the first system, the method further includes the following. In response to the first data cached containing instant data, the second processor is switched to the wake-up state and the instant data is synchronized to the second system with the first system.

Optionally, after the first data is cached with the first system, the method further includes the following. In response to a data alignment time point being reached, the second processor is switched to the wake-up state and the first data is synchronized to the second system with the first system.

Optionally, the second processor is switched to the wake-up state in response to the data alignment time point being reached as follows. A target data alignment time point corresponding to the first data is determined according to a real-time requirement of the first data, where data with different real-time requirements correspond to different data alignment time points, and a time interval between data alignment time points is negatively correlated with the real-time requirement. In response to the target data alignment time point being reached, the second processor is switched to the wake-up state.

Optionally, a communication component is mounted on the first processor. Before the first data is synchronized to the second system with the first system, the method further includes the following. When the second processor is in the wake-up state, in response to receiving, by the communication component, second data sent by an external device, the second data is synchronized to the second system with the first system.

Optionally, after the second event is processed with the second system, the method further includes the following. Third data is synchronized to the first system through a data communication service provided by the second system, where the third data is data generated in a process of processing the second event.

Optionally, after the second event is processed with the second system, the method further includes the following. In response to completion of processing of the second event, the second processor is maintained in the wake-up state within a dormant delay duration corresponding to the second event, where the dormant delay duration is determined according to a wake-up frequency of the second processor after the second event and/or determined according to an event type of the second event. In response to the dormant delay duration being reached, the second processor is switched to the dormant state and the first event is processed with the first system.

Optionally, the method further includes the following. According to an application scenario of a triggered event, the triggered event is classified as the first event or the second event, where the application scenario includes a weak interaction scenario and a strong interaction scenario.

Implementations of the disclosure provide a wearable device. The wearable device includes a processor and a memory. The processor at least includes a first processor configured to run a first system and a second processor configured to run a second system. The second processor has higher power consumption than the first processor. The memory is coupled with the processor, and stores at least one instruction. The at least one instruction, when executed by the processor, is operable with the wearable device to execute the above method for system switching.

Implementations of the disclosure provide a non-transitory computer-readable storage medium. The non-transitory computer-readable storage medium stores at least one instruction which, when executed by a processor of a wearable device at least including a first processor configured to run a first system and a second processor configured to run a second system, causes the wearable device to execute the above method for system switching.

Figure 3:
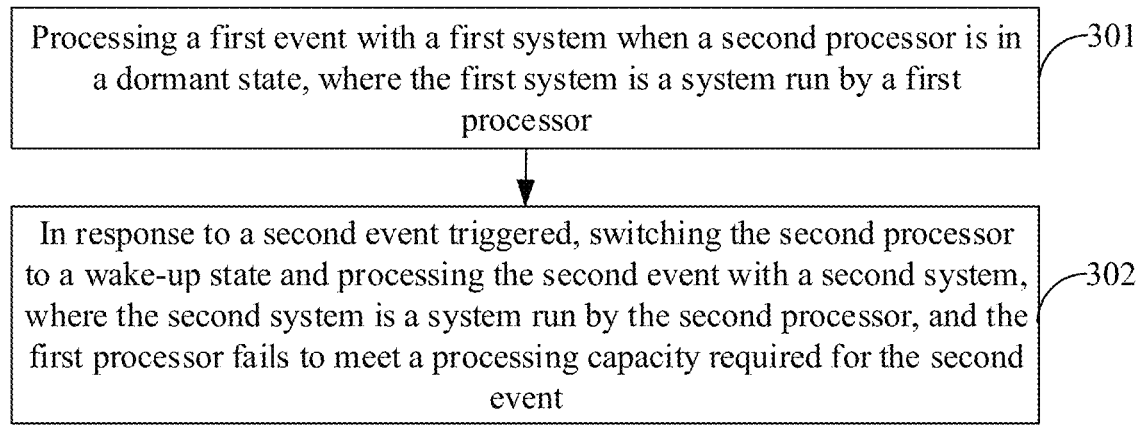
FIG. 3 is a flowchart illustrating a method for system switching provided in an exemplary implementation of the disclosure.

Referring to FIG. 3, FIG. 3 is a flowchart illustrating a method for system switching provided in an exemplary implementation of the disclosure. This implementation is illustrated by exemplarily applying the method to a wearable device. The method includes the following.

At 301, when a second processor is in a dormant state, a first event is processed with a first system, where the first system is a system run by a first processor.

In implementations of the disclosure, processing performance of the first processor is lower than that of the second processor (a processing capability of the first processor is lower than that of the second processor, and a processing speed of the first processor is lower than that of the second processor), and power consumption of the first processor is lower than that of the second processor. Accordingly, a second system can process an event processed by the first system, but the first system may not necessarily be able to process an event processed by the second system.

For example, the first processor is an MCU, the second processor is a CPU, the first system is an RTOS, and the second system is an Android® system.

In some implementations, a working mode of the wearable device includes a performance mode, a hybrid mode, and a low power-consumption mode. In the performance mode, both the second processor and the first processor are maintained in a wake-up state. In the low power-consumption mode, the first processor is maintained in a working state while the second processor is maintained in a turned-off state. In the hybrid mode, when the first event is processed with the first system, the second processor is maintained in a dormant state.

In a possible implementation, the first system is configured to process a first event, and the second system is configured to process a second event, where a processing capacity required for the first event is lower than a processing capacity required for the second event.

In another possible implementation, the first event and the second event are classified according to an application scenario. As an example, an event in a weak interaction scenario (i.e., a scenario with a low human-computer interaction frequency and a low processing performance requirement) is classified as the first event, while an event in a strong interaction scenario (i.e., a scenario with frequent human-computer interaction and a high processing performance requirement) is classified as the second event.

Taking a smart watch as an example of the wearable device, the first event may include events such as watch face display, watch face interface switching, and notification message display, and the second event may include events such as incoming call answering, application launching, watch face editing, and function setting. The specific types and classification manners of events are not limited in implementations of the disclosure.

Different from an electronic device with a strong interaction property such as a smart phone, the wearable device, as an auxiliary electronic device, has weak interaction with users in most usage scenarios. For instance, in most scenarios, users simply use smart watches to check the time by raising their wrists. Therefore, when processing the first event with the first system, the wearable device controls the second processor to be in the dormant state (the second system is in the dormant state), thereby reducing the overall power consumption of the wearable device.

At 302, in response to a second event triggered, the second processor is switched to a wake-up state and the second event is processed with a second system, where the second system is a system run by the second processor, and the first processor fails to meet a processing capacity required for the second event.

Due to the limited processing capacity of the first system, the first system cannot process all events. Therefore, in order to ensure that an event with a high processing capacity requirement can be processed in time, in implementations of the disclosure, when a second event requiring a processing capacity beyond a processing capacity of the first processor is triggered, the wearable device switches the second processor from the dormant state to the wake-up state, and switches a system for event processing from the first system to the second system, to process the second event with the second system.

The first processor failing to meet the processing capability required for the second event can be understood as: the first processor is unable to process the second event, or the first processor can process the second event, but a processing effect (e.g., a processing speed) cannot meet a processing effect requirement of the second event.

In implementations of the disclosure, when a processor is in the dormant state, a system run by the processor is in the dormant state. When the processor is switched from the dormant state to the wake-up state, the system run by the processor is also switched to the wake-up state.

In a possible implementation, a triggered event is recognized during operation of the first system. If the triggered event belongs to the second event, the second system is woken up; otherwise, the second system continues to remain in the dormant state. Optionally, the first system stores an event list containing various second events, and the first system determines whether the triggered event belongs to the second event according to the event list.

In some implementations, the first processor wakes up the second processor by sending an interrupt to the second processor, thereby waking up the second system to process the event.

Optionally, when the second processor is in the wake-up state, the first processor is in the wake-up state to prevent the first processor from frequently switching between the dormant state and the wake-up state, or the first processor is switched from the wake-up state to the dormant state to further reduce the power consumption of the device.

In sum, in implementations of the disclosure, the wearable device is equipped with the first processor with low power consumption and the second processor with high power consumption, and the first processor is configured to run the first system and the second processor is configured to run the second system. By introducing a system switching mechanism, the first event with a low processing capacity requirement is processed by the first system, and the second processor remains in the dormant state; when the second event requiring a processing capacity beyond a processing capacity of the first processor is triggered, the second processor is woken up and the second event is processed by switching to the second system, to ensure timely processing of the event. By adopting solutions of implementations of the disclosure, the power consumption of the wearable device can be reduced while ensuring the performance of the wearable device, thereby prolonging a battery life of the wearable device.

It is to be noted that, under the multi-processor architecture of implementations of the disclosure, since the first processor of the wearable device is in the working state most of the time and the second processor of the wearable device is mostly in the dormant state (because mostly some simple events need to be processed by the first processor), that is, most of the time, the first processor is a master processor of the wearable device and the second processor is a slave processor of the wearable device, logics of determining whether to wake up the processor and switch the operating system are executed by the first processor (the first system), and there is no need to additionally set a manager in the wearable device to monitor and evaluate events processed by different processors and there is no need to additionally set a switcher in the wearable device to switch between different processors, which is beneficial to reducing complexity of the system architecture in the wearable device.

In order to further reduce the power consumption of the wearable device, after the second system completes processing of the second event, the second processor is switched back to the dormant state, and processing of the first event is continued with the first system, so that the wearable device maintains high performance (and high power consumption) in few scenarios, but maintains low power consumption (and low performance) in most scenarios. In a possible implementation, after the operations at 302, the method further includes the following.

At 303, in response to completion of processing of the second event, the second processor is switched to the dormant state, and the first event is processed with the first system.

In order to keep the wearable device in a low power-consumption state in most scenarios, when processing of the second event is completed, the wearable device controls the second processor to enter the dormant state, and switches a system for event processing from the second system to the first system, so that the first system can continue to process the first event.

Optionally, the first processor is in the dormant state when the second system processes the second event, and the first processor is switched from the dormant state to the wake-up state when processing of the second event is completed. The second processor may wake up the first processor by sending an interrupt to the first processor.

By adopting the above dual-core dual-system switching mechanism, the wearable device can automatically switch between the first system and the second system according to processing capacity requirements in different application scenarios, which can rich application functions while prolonging the battery life.

Figure 4:
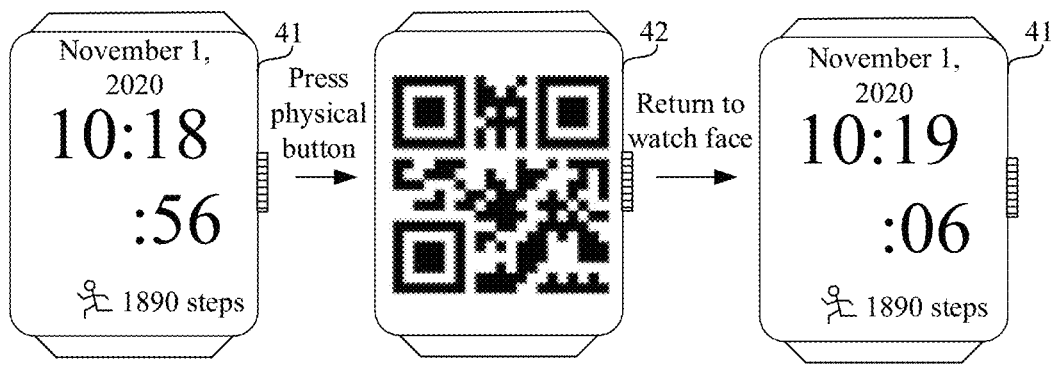
FIG. 4 illustrates schematic interface diagrams of a system process of a smart watch provided in an exemplary implementation of the disclosure.

Taking a smart watch as an example of the wearable device, in a schematic application scenario, the smart watch has an RTOS and an Android® system, where the RTOS is responsible for sensor data processing and watch face display, and the Android® system is responsible for implementing application functions. As illustrated in FIG. 4, the RTOS displays watch face 41, while the Android® system is in the dormant state, to maintain low power consumption. When a user needs to make payment by scanning a code with the wearable device, a scanning-code application can be launched through a physical button, and accordingly, when the smart watch detects an event of launching of the scanning-code application, the Android® system is woken up, and the scanning-code application is launched by switching to the Android® system, so that a two-dimensional payment barcode is displayed on scanning-code interface 42. In response to completion of the payment and returning to the watch face, the Android® system enters the dormant state, and the Android® system is switched to the RTOS to continue to display watch face 41.

In implementations of the disclosure, when processing of the second event is completed, the wearable device can switch the second processor back to the dormant state, and switch to the first system for event processing, so that the wearable device can be in a low power-consumption state in most scenarios, which can further prolong the battery life of the wearable device.

It is found in practical applications that, after switching to the second system to process the second event, the user generally performs operations related to the second event on the wearable device. If the second processor is switched back to the dormant state immediately upon completion of processing of the second event, the second processor may be re-awakened within a short time period, resulting in frequent switching of the second processor.

In order to avoid unnecessary switching between the wake-up state and the dormant state of the processor, in a possible implementation, in response to completion of processing of the second event, the wearable device maintains the second processor in the wake-up state within a dormant delay duration corresponding to the second event, switches the second processor to the dormant state when the dormant delay duration has elapsed, and processes the first event with the first system.

The dormant delay duration herein refers to a duration in which the processor delays entering the dormant state, and may be determined according to a wake-up frequency of the second processor after the second event and/or determined according to an event type of the second event.

Optionally, after the second processor is woken up in response to the second event each time, the second system records a wake-up frequency in a preset time period after the second event (the wake-up frequency may be determined by recording a time point of each wake-up), to determine the dormant delay duration of the second processor according to the wake-up frequency, where the dormant delay duration is positively correlated with the wake-up frequency, and the dormant delay duration has an upper limit. For example, the dormant delay duration ranges from 15 seconds to 2 minutes.

Optionally, the second system can also determine the dormant delay duration according to the event type of the second event, where a correspondence between event types and dormant delay durations may be set by default, or may be determined according to user's historical/previous usage records (which can be determined according to user's operation frequencies after different types of second events are triggered). Exemplarily, if the second event is an alarm-clock event, the dormant delay duration is 10 seconds (the user usually does not perform subsequent operations after turning off the alarm clock); if the second event is a notification-message event, the dormant delay duration is 30 seconds (the user usually performs a series of subsequent operations after reading the notification message).

In this implementation, by setting the dormant delay duration, the second processor is switched to the dormant state again when processing of the second event is completed and the dormant delay duration has elapsed, which can avoid frequent wake-up of the second processor.

In a possible implementation, since the first processor is always in the wake-up state during operation of the wearable device, the first system monitors the event (whether the first system can process the triggered event), and wakes up the second processor according to the monitoring result. When performing system switching, the systems need to switch a GUI display permission, to ensure correct display of a UI after system switching. The following are schematic implementations for illustration.

Figure 5:
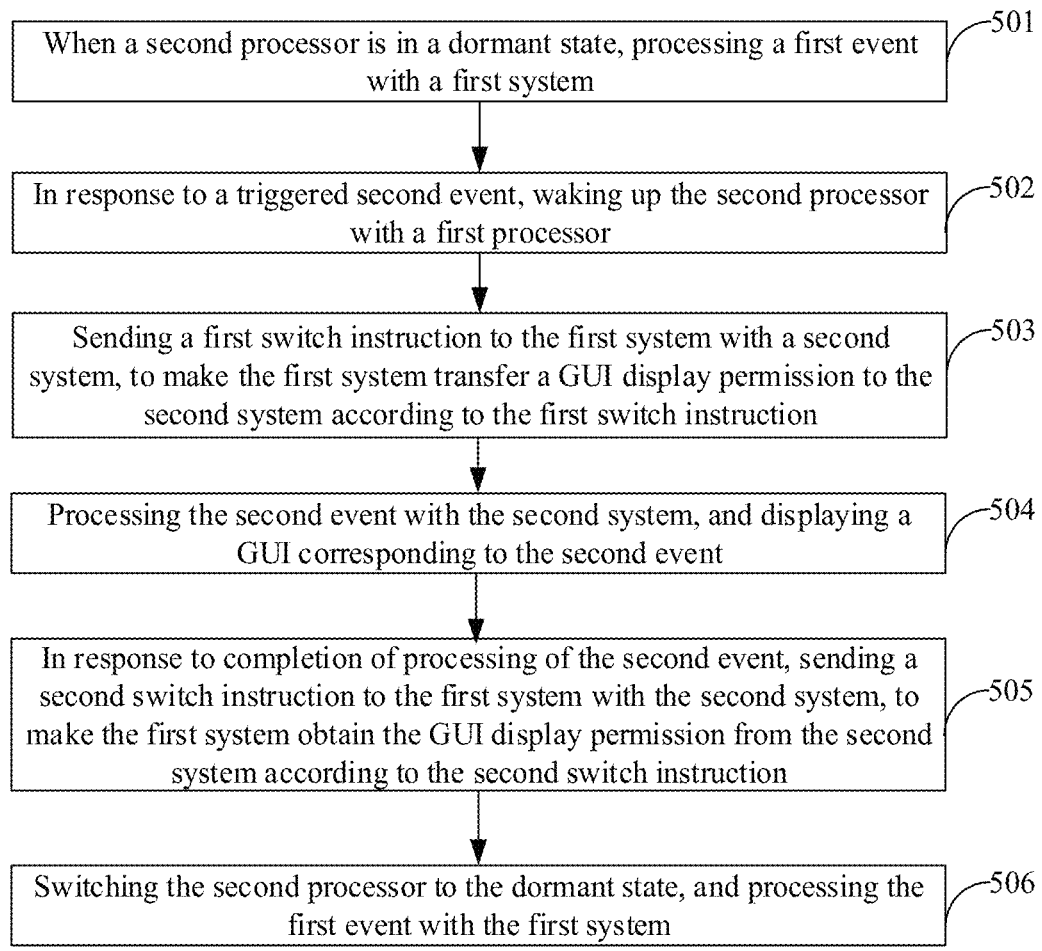
FIG. 5 is a flowchart illustrating a method for system switching provided in another exemplary implementation of the disclosure.

Referring to FIG. 5, FIG. 5 is a flowchart illustrating a method for system switching provided in another exemplary implementation of the disclosure. This implementation is illustrated by exemplarily applying the method to a wearable device. The method includes the following.

At 501, when a second processor is in a dormant state, a first event is processed with a first system.

For details of implementation of the above operations, reference may be made to the foregoing operations at 301, which will not be repeated in this implementation.

In a possible implementation, when the wearable device is powered on, the second processor pulls up a first processor in a startup process, and the second processor notifies the first processor after startup of the second processor is completed (i.e., startup of the second system is completed). After the startup of the second processor is completed (i.e., the startup of the second system is completed), the second processor sends a notification message to the first processor and enters the dormant state, and the first processor obtains a GUI display permission according to the notification message to display a UI (displaying a GUI of the first event).

Figure 6:
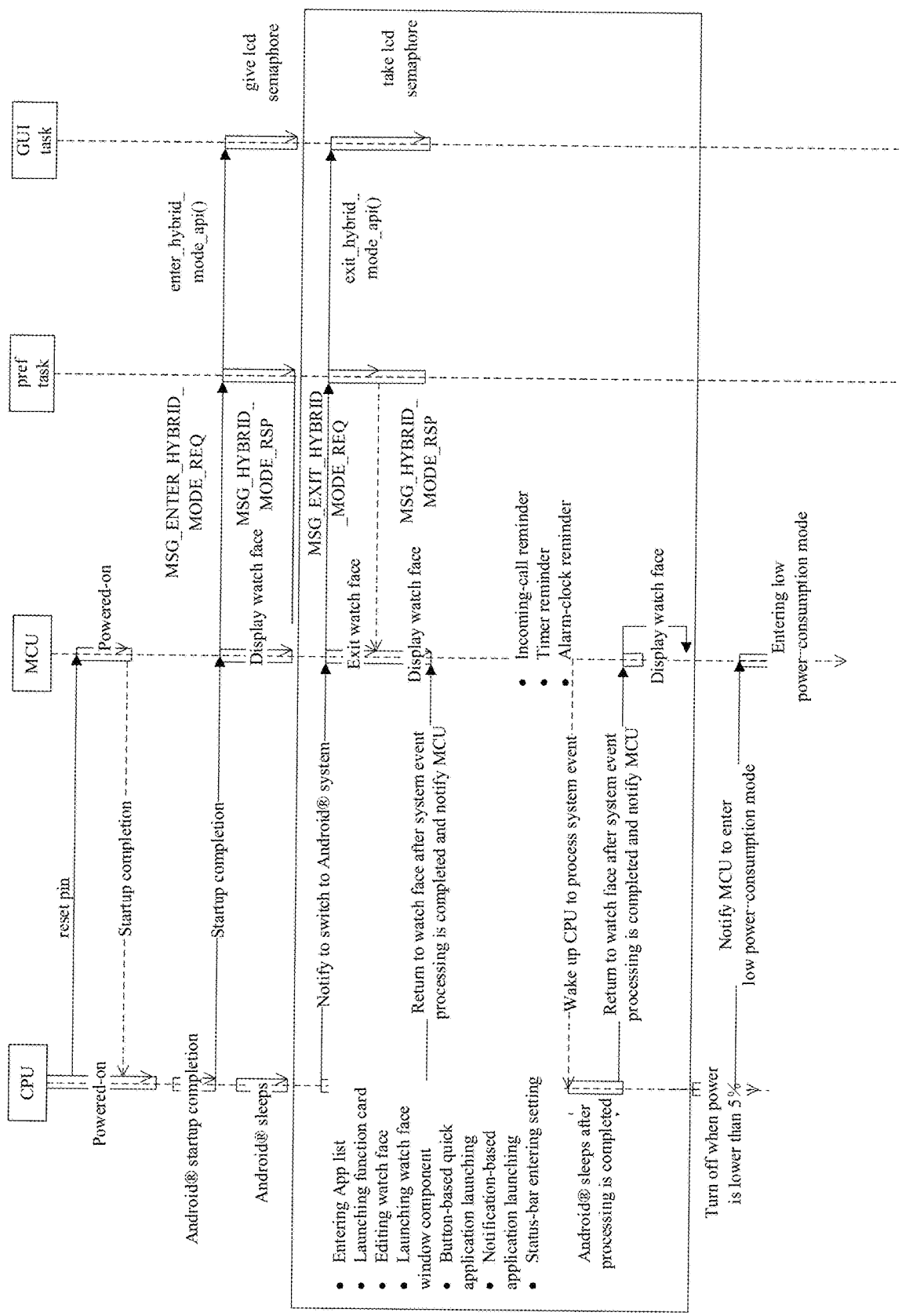
FIG. 6 is a timing diagram of a system switching process provided in an exemplary implementation of the disclosure.

Schematically, as illustrated in FIG. 6, in a startup process, a CPU pulls up an MCU with a reset signal (reset pin), and the MCU notifies the CPU when startup of the RTOS is completed. After startup of the Android® system is completed, the CPU sends a startup completion notification to the MCU, and the MCU sends a hybrid-mode enter request (MSG_ENTER_HYBRID_MODE_REQ) to the pref task. In response to receiving the hybrid-mode enter request, the pref task enters a hybrid mode by calling enter_hybrid_mode_api( ), and instructs the GUI task to transfer a display permission to the first system (give lcd semaphore). In response to receiving a hybrid-mode enter response (MSG_HYBRID_MODE_RSP) fed back by the pref task, the MCU displays a watch face.

At 502, in response to a second event triggered, the second processor is woken up with a first processor.

Optionally, the second event that triggers system switching and processor wake-up may be set in the first system by the developer in advance. During operation of the first system, when a triggered event is received, whether the event belongs to the second event is detected. If the event belongs to the second event, determine that system switching needs to be performed, and the second processor is woken up with the first processor; if the event does not belong to the second event, determine that the first processor can process the event, and the second processor remains in the dormant state.

In a possible implementation, when receiving the triggered second event, the first processor wakes up the second processor in the dormant state by sending an interrupt to the second processor.

In some implementations, the second event is an event triggered by a specified user operation. For instance, the wearable device is a smart watch, the specified user operation may include an operation of entering an application list (entering the application list by clicking an icon), an operation of launching a function card (enabling a corresponding function by clicking the function card), an operation of editing a watch face, an operation of launching a watch face window component, an operation of launching a shortcut application (triggered by a physical button), an operation of notification-based application launching (launching a corresponding application by clicking an application notification), an operation of status-bar entering setting (entering a setting interface through a status bar), etc.

In other implementations, the second event is an event triggered by an application. For instance, the wearable device is a smart watch, the second event may be an event triggered by a call application (incoming-call reminder), a timer application (timer reminder), or an alarm-clock application (alarm-clock reminder). The specific triggering manner and the type of the second event are not limited in implementations of the disclosure.

At 503, a first switch instruction is sent to the first system with a second system, to make the first system transfer a GUI display permission to the second system according to the first switch instruction.

Since the GUI display permission belongs to the first system (i.e., the wearable device displays a GUI of the first event processed by the first system) when the second processor is in the dormant state, and the wearable device needs to display a GUI of the second event during processing of the second event, the second system in the wake-up state instructs the first system to transfer the GUI display permission to the second system by sending a first switch instruction to the first system.

Schematically, as illustrated in FIG. 6, when receiving a user-triggered operation such as entering an application list, launching a function card, editing a watch face, launching a watch face window component, button-based quick application launching, notification-based application launching, and status-bar entering setting, the CPU and the Android® system are woken up, and the CPU sends to the MCU a notification of switching to the Android® system. In response to receiving a switch notification, the MCU sends a hybrid-mode exit request (MSG_EXIT_HYBRID_MODE_REQ) to the pref task. In response to receiving the hybrid-mode exit request, the pref task exits a hybrid mode by calling exit_hybrid_mode_api( ), and instructs the GUI task to transfer a display permission to the Android® system (take lcd semaphore). In response to receiving a hybrid-mode exit response (MSG_HYBRID_MODE_RSP) fed back by the pref task, the MCU exits watch face display, and the CPU controls a display to display a UI.

Similarly, when receiving an incoming-call reminder triggered by a call application, a timer reminder triggered by a timer application, or an alarm-clock reminder triggered by an alarm-clock application, the MCU wakes up the CPU for event processing.

At 504, the second event is processed with the second system, and a GUI corresponding to the second event is displayed.

Since the GUI display permission has been transferred to the second system, the second system can display the UI on a display screen of the wearable device during processing of the second event, and the second event can be completed under user interaction.

In a schematic example, the smart watch currently displays, with the RTOS, a watch face, when receiving a triggered alarm-clock reminder event, the smart watch stops using the displayed watch face, and wakes up and switches to the Android® system to display an alarm-clock application interface, so that the user can turn off the alarm clock in the alarm-clock application interface.

At 505, in response to completion of processing of the second event, a second switch instruction is sent to the first system with the second system, to make the first system obtain the GUI display permission from the second system according to the second switch instruction.

In a possible implementation, after processing of the second event is completed, if a triggered first event is received, the second processor enters the dormant state, and switch to the first system again; or, if processing of the second event is completed and no other triggered second event is received within a preset duration, the second processor enters the dormant state, and switch to the first system again.

As an example, when processing of the alarm-clock reminder event is completed and an operation of returning to a watch face is received, the Android® system running in the smart watch enters the dormant state and is switched to the RTOS to display the watch face again.

Since the GUI display permission belongs to the second system during processing of the second event, the second system needs to transfer the GUI display permission to the first system when the second system is switched to the first system, so that the first system can display a UI.

In some implementations, before the second processor is switched to the dormant state, the second system sends a second switch instruction to the first system, and the first system obtains the GUI display permission according to the second switch instruction.

Schematically, as illustrated in FIG. 6, when the Android® system completes processing of the event and an operation of returning to a watch face is received, the CPU sends a switch notification to the MCU and enters the dormant state, and the MCU obtains a display permission again according to the switch notification and displays the watch face.

At 506, the second processor is switched to the dormant state, and the first event is processed with the first system.

Further, the wearable device continues to process the first event with the first system, and displays a GUI of the first event. When the triggered second event is received again, the wearable device performs the operations at 502-505 repeatedly.

In some implementations, the above system switching process is executed when a power of the wearable device is higher than a threshold. In order to ensure that the wearable device can realize most basic functions such as time display function of a smart watch, the second processor in the wearable device is turned off when the power of the wearable device is lower than the threshold, a mode switch instruction is sent to the first processor, and the first processor is switched to a low power-consumption mode in response to receiving the mode switch instruction. In the low power-consumption mode, the first system stops processing of the triggered second event.

Schematically, as illustrated in FIG. 6, when a (remaining) power of the smart watch is lower than 5%, the CPU sends to the MCU a mode switch instruction of entering a low power-consumption mode and is turned off. In response to receiving the mode switch instruction, the MCU enters the low power-consumption mode.

In this implementation, when an event that cannot be processed by the first processor is triggered, the second processor is woken up, and the second system notifies the first system to perform system switching, to obtain the GUI display permission, which can ensure that the UI of the second event can be displayed normally during processing of the event by the second system. Moreover, when the second system is switched back to the first system, the first system obtains the GUI display permission from the second system again, to ensure normal display of the UI of the first event. As such, seamless switching between the dual systems can be realized.

In the implementation illustrated in FIG. 5, when switching between the first system and the second system, switching of the GUI display permission is required. In another possible implementation, when the second event that cannot be processed by the first processor is triggered, the wearable device processes the second event with the second system, and data obtained by processing the second event by the second system is fed back to the first system, and the first system displays the GUI according to the data, that is, there is no need to switch the GUI display permission between the first system and the second system.

Figure 7:
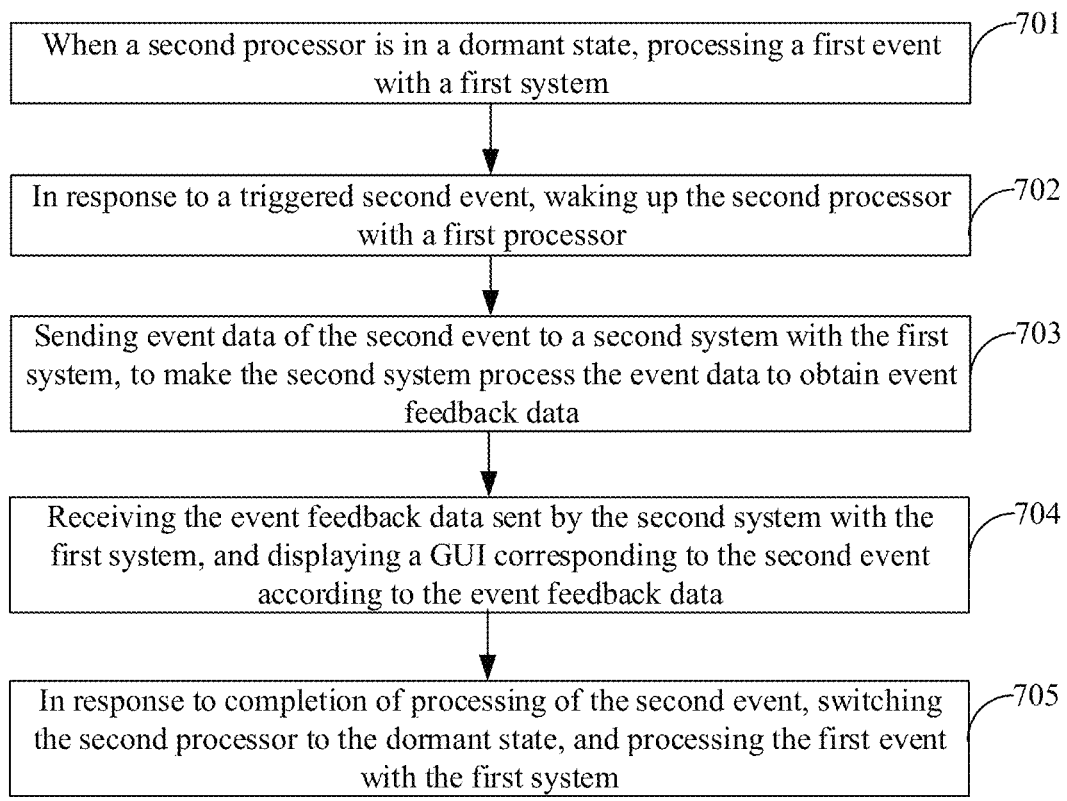
FIG. 7 is a flowchart illustrating a method for system switching provided in another exemplary implementation of the disclosure.

Referring to FIG. 7, FIG. 7 is a flowchart illustrating a method for system switching provided in another exemplary implementation of the disclosure. This implementation is illustrated by exemplarily applying the method to a wearable device. The method includes the following.

At 701, when a second processor is in a dormant state, a first event is processed with a first system.

At 702, in response to a triggered second event, the second processor is woken up with a first processor.

For details of implementation of the operations at 701-702, reference may be made to the foregoing operations at 501-502, which will not be repeated in this implementation.

At 703, event data of the second event is sent to a second system with the first system, to make the second system process the event data to obtain event feedback data.

After the second processor is woken up, the second system is in the wake-up state. Different from the foregoing implementation in which the second system needs to obtain the GUI display permission from the first system, in this implementation, the second system is in a background silent processing state after being woken up, and is only used for data processing in the background. The GUI display permission still belongs to the first system, that is, there is no need to switch the GUI display permission.

Moreover, in order to enable the second system to process the second event, the first system sends the event data of the second event to the second system, and the second system processes the second event according to the event data.

The event data herein may be service request data of a service requested by the second event or application request data of a requested application. Accordingly, the event feedback data obtained by processing the second event by the second system may be service data or application data.

At 704, the event feedback data sent by the second system is received with the first system, and a GUI corresponding to the second event is displayed according to the event feedback data.

Further, the second system sends the event feedback data to the first system, and the first system further processes the event feedback data, and packs data (UI data) required for displaying a GUI in the foreground, so that the GUI of the second event can be displayed subsequently according to the packaged UI data.

At 705, in response to completion of processing of the second event, the second processor is switched to the dormant state, and the first event is processed with the first system.

After processing of the second event is completed, the wearable device switches the second processor to the dormant state (without switching the GUI display permission), processes the first event with the first system, and displays the GUI of the first event.

In this implementation, when the second event that cannot be processed by the first processor is triggered, the second processor is woken up, and the second system performs silent processing on the second event and sends the obtained event feedback data to the first system, so that the first system can display the GUI of the second event according to the event feedback data, which can realize timely processing of a performance event without switching the GUI display permission, thereby reducing implementation complexity of system switching.

Since the first processor and the second processor work asynchronously, during system switching (the first system is switched to the second system, or the second system is switched to the first system), data synchronization between the systems is required to ensure data consistency between different systems. The following are schematic implementations for illustration.

Figure 8:
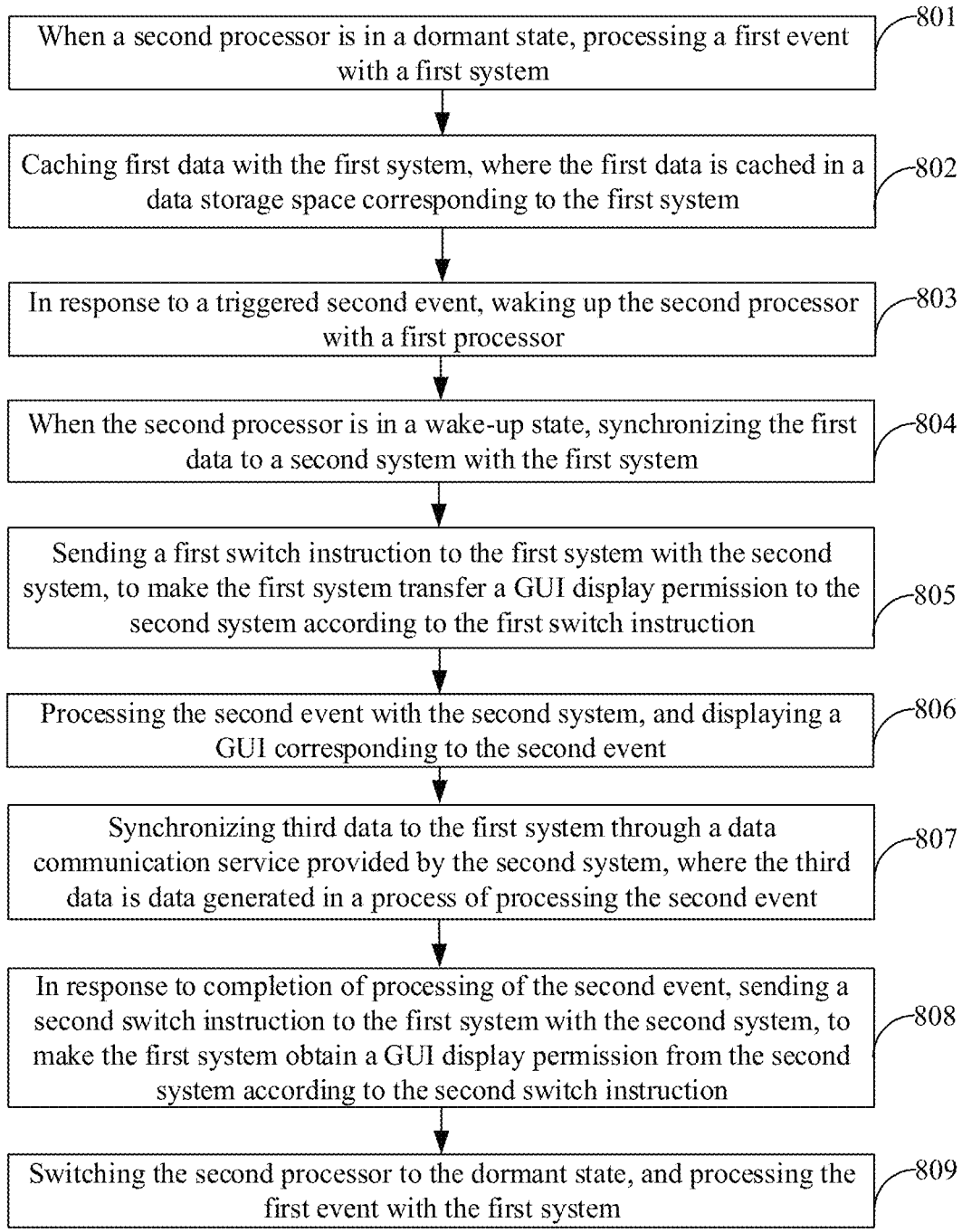
FIG. 8 is a flowchart illustrating a method for system switching provided in another exemplary implementation of the disclosure.

Referring to FIG. 8, FIG. 8 is a flowchart illustrating a method for system switching provided in another exemplary implementation of the disclosure. This implementation is illustrated by exemplarily applying the method to a wearable device. The method includes the following.

At 801, when a second processor is in a dormant state, a first event is processed with a first system.

For details of implementation of the above operations, reference may be made to the foregoing operations at 501, which will not be repeated in this implementation.

At 802, first data is cached with the first system, where the first data is cached in a data storage space corresponding to the first system.

In a possible implementation, the first processor and the second processor each correspond to a data storage space. When the second processor is in the dormant state, in order to avoid the problem of high power consumption caused by frequent wake-up of the second processor, the first system caches data generated when the first system processes the first event or the first system caches data received from an external device.

Schematically, as illustrated in FIG. 8, when the wearable device is coupled with a mobile phone via Bluetooth and collects synchronization data (SyncData) to the MCU through Bluetooth, the MCU caches the received synchronization data, and sends synchronization completion feedback (syncOK) to the mobile phone through Bluetooth after completing the synchronization.

At 803, in response to a triggered second event, the second processor is woken up with a first processor.

For details of implementation of the above operations, reference may be made to the foregoing operations at 502, which will not be repeated in this implementation.

At 804, when the second processor is in a wake-up state, the first data is synchronized to a second system with the first system.

In a possible implementation, after the second processor is woken up, in order to ensure that data of the second system is consistent with data of the first system when the second system processes an event later, the first system initiates data synchronization to the second system, to synchronize all or part of the first data to the second system. Synchronization policies (partial synchronization or full synchronization) for different types of data may be the same or different.

Optionally, the second system of implementations of the disclosure provides a data communication service for data transfer (this service may be located in the framework service of the application layer), and the first system and the second system exchange data through the data communication service. When performing data synchronization, the first system binds, according to a data type of the first data, a data synchronization service through a data communication service, to synchronize the first data to a target application in the second system through the bound data synchronization service, where the target application is used to process the first data.

Optionally, different data types correspond to different data synchronization services. The data type is related to an application used to process the data, and different applications correspond to different data synchronization services. The first data is, for example, pedometer data, a data synchronization service corresponding to a pedometer application is bound, and the pedometer data is sent to the pedometer application through the data synchronization service. The first data is, for example, alarm-clock setting data, a data synchronization service corresponding to an alarm-clock application is bound, and the alarm-clock setting data is sent to the alarm-clock application through the data synchronization service.

Optionally, after the target application processes the synchronized first data, the processed data is further synchronized to the first system through the data communication service, to maintain data consistency between the dual systems.

Figure 9:
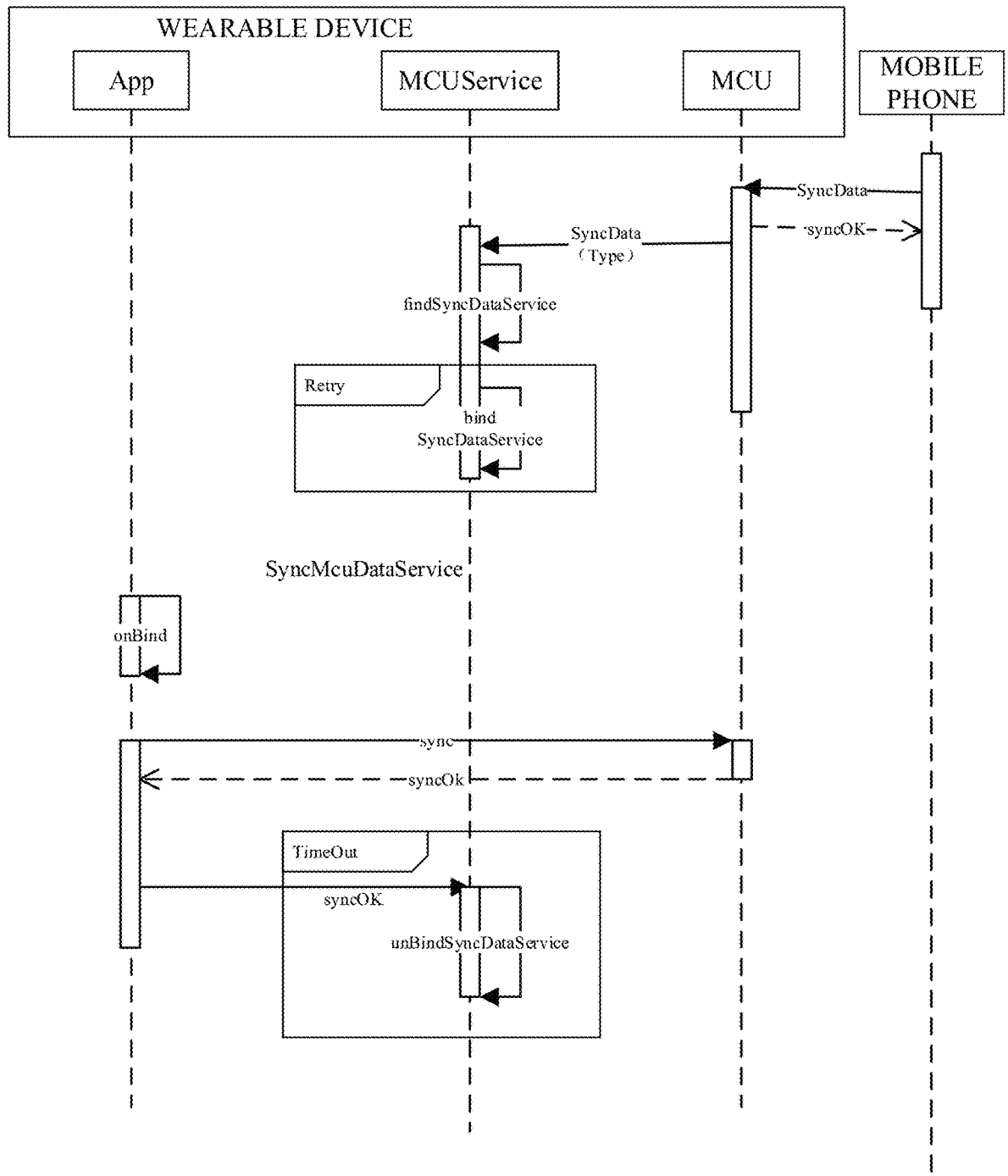
FIG. 9 is a timing diagram of an inter-system data synchronization process provided in an exemplary implementation of the disclosure.

Schematically, as illustrated in FIG. 9, after the second system is woken up, the MCU sends synchronization data (SyncData) to the MCUService provided by the second system, and the MCUService finds a corresponding data synchronization service (findSyncDataService) according to a data type of the synchronization data, to bind the synchronization data with the found data synchronization service (bindSyncDataService), where the MCUService uses a retry mechanism when finding the data synchronization service. After binding of the data synchronization service is completed, the MCUService sends synchronization data to a target application for processing the synchronization data through service (SyncMcuDataService), where the target application is bound to the service (onBind).

After the target application processes the synchronization data, the processed data is fed back through the MCUService. Accordingly, the MCU synchronizes the received data and feeds back a synchronization completion instruction to the target application. In response to receiving the synchronization completion instruction, the target application sends the synchronization completion instruction to the MCUService, to instruct the MCUService to unbind the data synchronization service (unBindSyncDataService).

In a possible application scenario, a communication component (e.g., a Bluetooth component) is mounted on the first processor, before first data is synchronized to the second system with the first system, in response to receiving, by the communication component, second data sent by an external device, the second data is synchronized to the second system with the first system, and the first data is synchronized after synchronization of the second data is completed.

As an example, in a process of synchronizing stored alarm-clock data by the first system to the second system, if the first system receives alarm-clock data sent by the mobile phone through Bluetooth, the first system synchronizes the alarm-clock data received through Bluetooth to the second system, and then synchronizes the cached alarm-clock data to the second system.

At 805, a first switch instruction is sent to the first system with the second system, to make the first system transfer a GUI display permission to the second system according to the first switch instruction.

At 806, the second event is processed with the second system, and a GUI corresponding to the second event is displayed.

For details of implementation of the operations at 805-806, reference may be made to the foregoing operations at 503-504, which will not be repeated in this implementation.

At 807, third data is synchronized to the first system through a data communication service provided by the second system, where the third data is data generated in a process of processing the second event.

The second system will generate new data in a process of processing the second event, and the generated new data may not be consistent with data in the first system. The second event is, for example, an operation of setting a watch face, a watch face pattern may change before and after the operation of setting the watch face. Therefore, the second system needs to synchronize the generated new data (i.e., the third data) to the first system.

Optionally, the second system synchronizes the third data to the first system through a data communication service. For this process, reference may be made to a process of synchronizing data by the first system to the second system, which will not be repeated in this implementation.

In a possible implementation, the second system synchronizes to the first system data generated in a process of processing the second event in real time, or the second system synchronizes the generated data to the first system when processing of the second event is completed.

Figure 10:
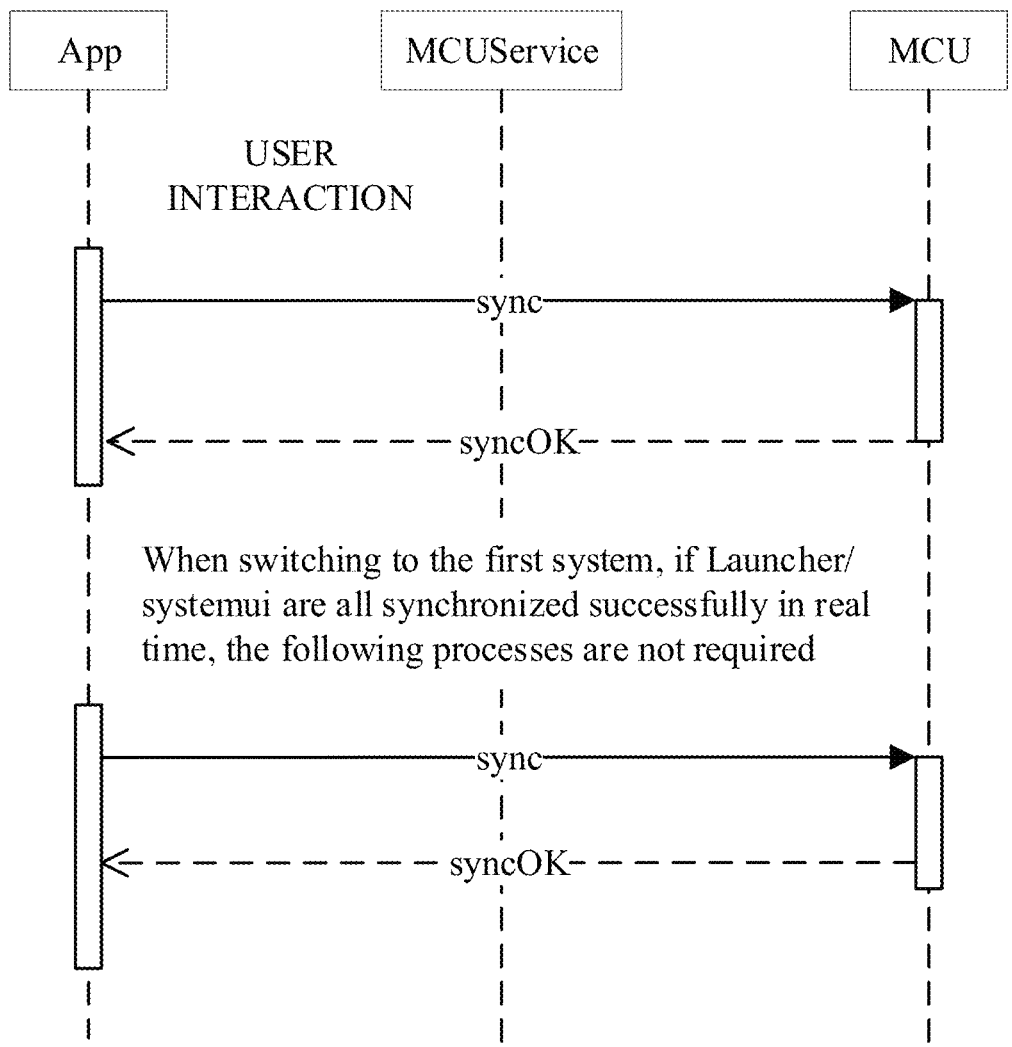
FIG. 10 is a timing diagram of an inter-system data synchronization process provided in another exemplary implementation of the disclosure.

Schematically, as illustrated in FIG. 10, in the wake-up state, the App in the Android® system runs and receives user interaction operations, and the App synchronizes data generated during user interaction to the MCU in real time through the MCUService (i.e., sync in the figure). After receiving the data synchronized by the App, the MCU feeds back a synchronization completion instruction (syncOK) to the App.

At 808, in response to completion of processing of the second event, a second switch instruction is sent to the first system with the second system, to make the first system obtain a GUI display permission from the second system according to the second switch instruction.

For details of implementation of the above operations, reference may be made to the foregoing operations at 505, which will not be repeated in this implementation.

It is to be noted that, if the third data is not fully synchronized when switching to the first system again, the second system needs to fully synchronize the third data to the first system before entering the dormant state; if the third data is fully synchronized in real time, there is no need to perform a synchronization process.

Schematically, as illustrated in FIG. 10, when switching to the first system, since the third data has not been fully synchronized, before entering the dormant state, it is necessary to continue to synchronize the third data to the MCU through the MCUService until the third data is fully synchronized.

At 809, the second processor is switched to the dormant state, and the first event is processed with the first system.

For details of implementation of the above operations, reference may be made to the foregoing operations at 506, which will not be repeated in this implementation.

In this implementation, after the second system is woken up, the first system synchronizes data generated or received when the second processor is in the dormant state to the second system through the data communication service provided by the second system; the second system synchronizes data generated during operation to the first system, to realize data seamless connection before and after system switching, which can avoid the problem of data inconsistency before and after system switching, thereby ensuring data consistency between the dual systems.

For data of different types, data synchronization strategies adopted by the first system may be different. In a possible implementation, the data synchronization strategies include the following four synchronization strategies: 1. real-time synchronization; 2. fixed-length synchronization; 3. combined synchronization; 4. timing synchronization. The four synchronization strategies will be depicted respectively below.

1. Real-Time Synchronization

For data with a high real-time requirement such as alarm-clock data, if synchronization is performed when the second system is woken up by an event, the problem of untimely synchronization may occur. Therefore, in a possible implementation, when cached first data contains instant data, the first processor actively wakes up the second processor, to synchronize the instant data to the second system with the first system.

In a schematic scenario, when the second processor is in the dormant state, if the first system receives alarm-clock data synchronized by a mobile phone through Bluetooth, the first processor wakes up the second processor and the alarm-clock data is synchronized to the second system.

Optionally, when the first system synchronizes data to the second system in real time, the first system still has a GUI display permission, that is, the wearable device still displays a GUI of the first system, and the second system and the first system perform silent synchronization in the background.

2. Fixed-Length Synchronization

A data storage space corresponding to the first processor is generally relatively small, and accordingly, a volume of data (i.e., data volume) that the first system can cache is relatively small. When the volume of the cached data reaches an upper limit of the data storage space, the first system overwrites the cached data. In order to avoid data loss caused by data overwriting, in a possible implementation, in response to a data volume of the first data cached reaching a storage-capacity threshold, the first processor wakes up the second processor, to synchronize the first data to the second system with the first system.

In a schematic example, when a remaining storage space of a data storage space corresponding to the first system is less than 20%, the first processor actively wakes up the second processor in the dormant state, and the cached data is synchronized to the second system.

Optionally, when the first system uses a fixed-length synchronization strategy to synchronize data to the second system, the first system still has a GUI display permission, that is, the wearable device still displays a GUI of the first system, and the second system and the first system perform silent synchronization in the background.

3. Combined Synchronization

In a possible implementation, for cached data with a small data volume, when the second processor is in the wake-up state, the first system combines the cached data and then synchronizes the combined data to the second system.

Optionally, when the first system synchronizes the first data to the second system, the first system synchronizes target data in the first data to the second system, where a data volume of the target data is less than a data-volume threshold. Optionally, the target data may be non-instant data. For instance, the target data is notification-message data or health data whose bytes are less than 100 bytes, and the specific type of the target data is not limited in this implementation.

4. Timing Synchronization

In order to avoid frequent wake-up of the second processor, in a possible implementation, the wearable device adopts a timing synchronization mechanism, and the second processor is switched to the wake-up state in response to a data alignment time point being reached, to synchronize the first data cached in the data storage space to the second system with the first system. Moreover, after the data synchronization is completed, the second processor is switched to the dormant state again, thereby reducing the power consumption of the wearable device.

Figure 11:
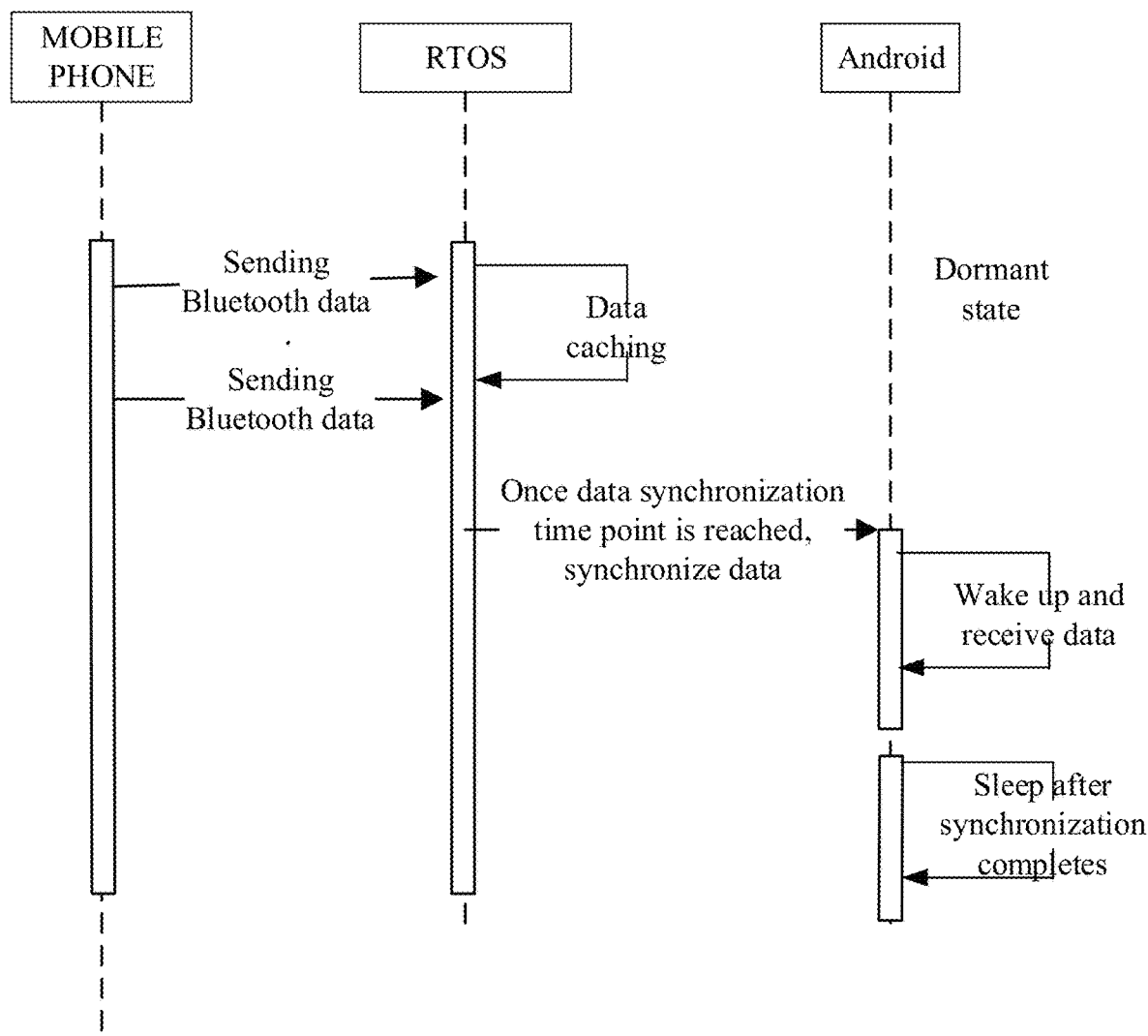
FIG. 11 is a timing diagram of a timing synchronization process provided in an exemplary implementation of the disclosure.

Schematically, as illustrated in FIG. 11, when the Android® system is in the dormant state, the mobile phone sends Bluetooth data to the RTOS through a Bluetooth connection. Since a data synchronization time point has not been reached, the RTOS caches the Bluetooth data. Once the data synchronization time point is reached, the Android® system is woken up and receives the Bluetooth data synchronized by the RTOS. After the data synchronization is completed, the Android® system enters the dormant state again.

Moreover, considering that different data may have different real-time requirements, in a possible implementation, different data alignment time points are set in advance for data with different real-time requirements. Accordingly, when performing data synchronization, the first system determines, according to a real-time requirement of the first data cached in the data storage space, a target data alignment time point corresponding to the first data, to wake up the second processor and perform data synchronization when the target data alignment time point is reached.

A time interval between adjacent data alignment time points is negatively correlated with the real-time requirement. That is, the higher a real-time requirement of the data, the shorter a time interval between corresponding data alignment time points, and accordingly, the higher a timing synchronization frequency of the data, which can ensure that data with a high real-time requirement can be synchronized to the second system as soon as possible, thereby ensuring data consistency between the dual systems.

Optionally, the time interval between adjacent data alignment time points is a fixed value, such as 1 minute, 5 minutes, etc. The time interval between adjacent data alignment time points may also be a dynamic value. For instance, an event interval is adjusted dynamically according to a corresponding time period or historical data synchronization condition (e.g., a time interval at night can be longer than a time interval during the day).

Optionally, a correspondence between different data and real-time requirements is set in the first system in advance. For example, the first system is provided with a correspondence between data types and real-time requirement levels, where a higher real-time requirement level indicates that data belonging to the data type has a higher real-time requirement for synchronization.

In a schematic example, the first system receives function-card update data sent by a terminal through Bluetooth at 11:01:10, receives watch face update data sent by the terminal through Bluetooth at 11:01:45 (a user modify a watch face of the wearable device at a terminal side), and updates pedometer data at 11:01:55. The first system caches the function-card update data, the watch face update data, and the pedometer data in the data storage space in sequence. Once a data synchronization time point of 11:02:00 is reached, the second processor is woken up, and the first system synchronizes the function-card update data, the watch face update data, and the pedometer data to the second system.

Optionally, the four synchronization strategies may be executed individually or in combination.

In some implementations, fixed-length synchronization and combined synchronization are implemented in combination. Once a data volume of the first data reaches a storage-capacity threshold, the first processor wakes up the second processor, and the first system combines cached data with a small data volume (e.g., health data collected by a sensor) are merged, to synchronize the combined cached data to the second system.

In some implementations, timing synchronization and combined synchronization are implemented in combination. When a data synchronization time point is reached, the first processor wakes up the second processor, and the first system combines cached data with a small data volume, to synchronize the combined cached data to the second system.

In some implementations, real-time synchronization and combined synchronization are implemented in combination. When the cached first data contains instant data, the first processor wakes up the second processor, and the instant data is synchronized to the second system with the first system. Also, the first system combines cached data with a small data volume, to synchronize the combined cached data to the second system.

In some implementations, fixed-length synchronization and timing synchronization are implemented in combination. On condition that a data alignment time point has not been reached, if a data volume of the first data reaches a storage-capacity threshold, the first processor wakes up the second processor, and the first system combines cached data with a small data volume, to synchronize the combined cached data to the second system. On condition that the data alignment time point is reached, the first processor wakes up the second processor, and the cached data is synchronized to the second system with the first system.

It is to be noted that, the above implementations only schematically illustrate combination of synchronization policies. In actual application, all, any two, or any three of the four synchronization policies can be combined and executed, and combination and execution of synchronization policies are not limited in implementations of the disclosure.

In these implementations, different data synchronization mechanisms are adopted, which can ensure that data can be synchronized to the second system timely and accurately while shortening a wake-up duration of the second system, and can avoid data loss, thereby further ensuring the data consistency between the dual systems, and improving stability during switching of the dual systems.

It is to be noted that, in the foregoing implementations, only the first processor (corresponding to the first system) and the second processor (corresponding to the second system) are used for schematic illustration. When the wearable device is equipped with three or more processors, the wearable device can switch among three or more systems (different systems are run under different performance-requirement scenarios), which is not limited in implementations.

Figure 12:
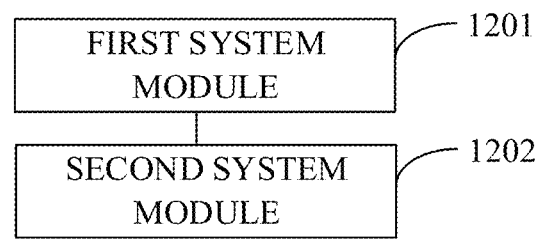
FIG. 12 is a structural block diagram illustrating an apparatus for system switching provided in an implementation of the disclosure.

Referring to FIG. 12, FIG. 12 is a structural block diagram illustrating an apparatus for system switching provided in an implementation of the disclosure. The apparatus can be implemented as all or part of a wearable device through software, hardware, or combination of the software and the hardware. The apparatus includes a first system module 1201 and a second system module 1202. The first system module 1201 is configured to process a first event with a first system when the second processor is in a dormant state, where the first system is a system run by the first processor. The second system module 1202 is configured to switch the second processor to a wake-up state and process the second event with a second system, in response to a second event triggered, where the second system is a system run by the second processor, and the first processor fails to meet a processing capacity required for the second event.

Optionally, the second system module 1202 includes a first instruction sending unit and a first display unit. The first instruction sending unit is configured to send a first switch instruction to the first system with the second system, to make the first system transfer a GUI display permission to the second system according to the first switch instruction. The first display unit is configured to process the second event with the second system, and display a GUI corresponding to the second event.

Optionally, the first system module 1201 includes a data feedback unit and a second display unit. The data feedback unit is configured to send event data of the second event to the second system with the first system, to make the second system process the event data to obtain event feedback data. The second display unit is configured to receive the event feedback data sent by the second system with the first system, and display a GUI corresponding to the second event according to the event feedback data.

Optionally, the first system module 1201 is further configured to switch the second processor to the dormant state and process the first event with the first system, in response to completion of processing of the second event.

Optionally, the second system has a GUI display permission in a process of processing the second event. The second system module 1202 is further configured to send a second switch instruction to the first system with the second system, to make the first system obtain the GUI display permission from the second system according to the second switch instruction.

Optionally, the apparatus further includes a caching module and a first synchronization module. The caching module is configured to cache first data with the first system when the second processor is in the dormant state, where the first data is cached in a data storage space corresponding to the first system. The first synchronization module is configured to synchronize the first data to the second system with the first system when the second processor is in the wake-up state.

Optionally, the first synchronization module is configured to: bind, according to a data type of the first data, a data synchronization service through a data communication service provided by the second system, where different data types correspond to different data synchronization services; and synchronize the first data to a target application in the second system through the data synchronization service bound, where the target application is used to process the first data.

Optionally, the first synchronization module is further configured to synchronize target data in the first data to the second system with the first system, where a data volume of the target data is less than a data-volume threshold.

Optionally, the apparatus further includes a second synchronization module. The second synchronization module is configured to switch the second processor to the wake-up state and synchronize the first data to the second system with the first system, in response to a data volume of the first data cached reaching a storage-capacity threshold.

Optionally, the apparatus further includes a third synchronization module. The third synchronization module is configured to switch the second processor to the wake-up state and synchronize instant data to the second system with the first system, in response to the first data cached containing the instant data.

Optionally, the apparatus further includes a fourth synchronization module. The fourth synchronization module is configured to switch the second processor to the wake-up state and synchronize the first data to the second system with the first system, in response to a data alignment time point being reached.

Optionally, the fourth synchronization module is specifically configured to: determine a target data alignment time point corresponding to the first data according to a real-time requirement of the first data, where data with different real-time requirements correspond to different data alignment time points, and a time interval between data alignment time points is negatively correlated with the real-time requirement; and switch the second processor to the wake-up state in response to the target data alignment time point being reached.

Optionally, a communication component is mounted on the first processor. The apparatus further includes a fourth synchronization module. The fourth synchronization module is configured to synchronize second data to the second system with the first system in response to receiving, by the communication component, the second data sent by an external device, when the second processor is in the wake-up state.

Optionally, the apparatus further includes a fifth synchronization module. The fifth synchronization module is configured to synchronize third data to the first system through a data communication service provided by the second system, where the third data is data generated in a process of processing the second event.

Optionally, the apparatus further includes a wake-up maintaining module. The wake-up maintaining module is configured to maintain the second processor in the wake-up state within a dormant delay duration corresponding to the second event in response to completion of processing of the second event, where the dormant delay duration is determined according to a wake-up frequency of the second processor after the second event and/or determined according to an event type of the second event. The first system module 1201 is further configured to switch the second processor to the dormant state and process the first event with the first system, in response to the dormant delay duration being reached.

In sum, in implementations of the disclosure, the wearable device is equipped with the first processor with low power consumption and the second processor with high power consumption, and the first processor is configured to run the first system and the second processor is configured to run the second system. By introducing a system switching mechanism, the first event with a low processing capacity requirement is processed by the first system, and the second processor is maintained in the dormant state; when the second event requiring a processing capacity beyond a processing capacity of the first processor is triggered, the second processor is woken up and the second event is processed by switching to the second system, to ensure timely processing of the event. By adopting solutions of implementations of the disclosure, the power consumption of the wearable device can be reduced, while ensuring the performance of the wearable device, thereby prolonging a battery life of the wearable device.

In implementations of the disclosure, when processing of the second event is completed, the wearable device can switch the second processor back to the dormant state, and switch to the first system for event processing, so that the wearable device can be in a low power-consumption state in most scenarios, which can further prolong the battery life of the wearable device.

In implementations of the disclosure, by setting the dormant delay duration, the second processor is switched to the dormant state again when processing of the second event is completed and the dormant delay duration has elapsed, which can avoid frequent wake-up of the second processor.

In implementations of the disclosure, when an event that cannot be processed by the first processor is triggered, the second processor is woken up, and the second system notifies the first system to perform system switching, to obtain the GUI display permission, which can ensure that the UI of the second event can be displayed normally during processing of the event by the second system. Moreover, when the second system is switched back to the first system, the first system obtains the GUI display permission from the second system again, to ensure normal display of the UI of the first event. As such, seamless switching between the dual systems can be realized.

In implementations of the disclosure, when the second event that cannot be processed by the first processor is triggered, the second processor is woken up, and the second system performs silent processing on the second event and sends the obtained event feedback data to the first system, so that the first system can display the GUI of the second event according to the event feedback data, which can realize timely processing of a performance event without switching the GUI display permission, thereby reducing implementation complexity of system switching.

In implementations of the disclosure, after the second system is woken up, the first system synchronizes data generated or received when the second processor is in the dormant state to the second system through the data communication service provided by the second system; the second system synchronizes data generated during operation to the first system, to realize data seamless connection before and after system switching, which can avoid the problem of data inconsistency before and after system switching, thereby ensuring data consistency between the dual systems.

In implementations of the disclosure, different data synchronization mechanisms are adopted, which can ensure that data can be synchronized to the second system timely and accurately while shortening a wake-up duration of the second system, and can avoid data loss, thereby further ensuring the data consistency between the dual systems, and improving stability during switching of the dual systems.

Figure 13:
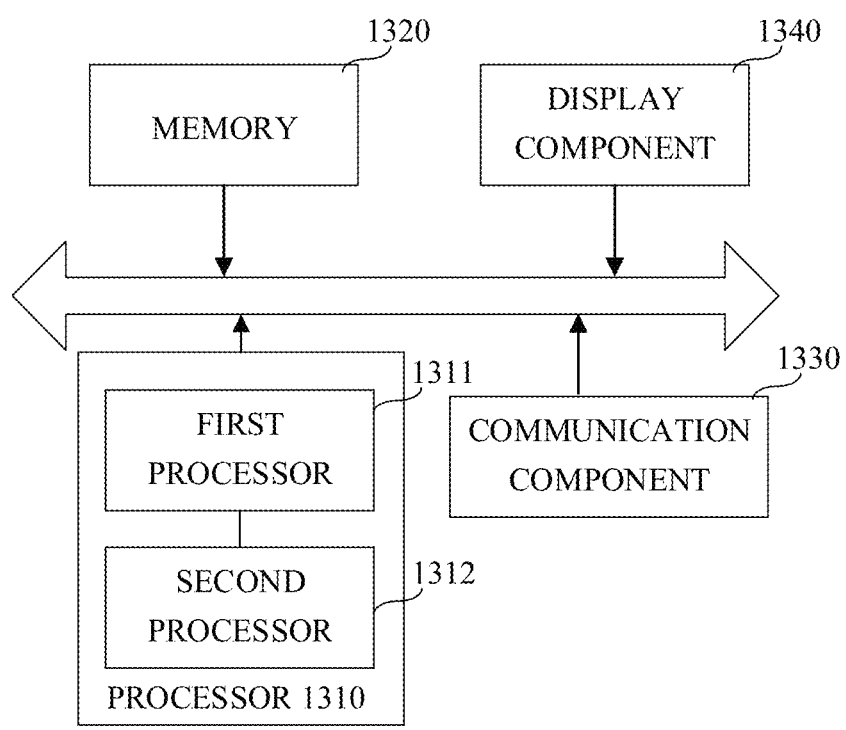
FIG. 13 is a structural block diagram illustrating a wearable device provided in an exemplary implementation of the disclosure.

Referring to FIG. 13, FIG. 13 is a structural block diagram illustrating a wearable device provided in an exemplary implementation of the disclosure. The wearable device of the disclosure may include one or more of the following components: a processor 1310 and a memory 1320.

The processor 1310 at least includes a first processor 1311 and a second processor 1312, where the first processor 1311 is used to run a first system and the second processor 1312 is used to run a second system, power consumption of the first processor 1311 is lower than that of the second processor 1312, and performance of the first processor 1311 is lower than that of the second processor 1312. The processor 1310 uses various interfaces and lines to connect various parts of the entire electronic device, and executes various functions of the electronic device and processes data by running or executing instructions, programs, code sets or instruction sets stored in the memory 1320 and calling data stored in the memory 1320. Optionally, the processor 1310 may be implemented in at least one of the following hardware forms: digital signal processing (DSP), field-programmable gate array (FPGA), and programmable logic array (PLA). The processor 1310 may integrate combination of one or more of a CPU, a graphics processing unit (GPU), a neural-network processing unit (NPU), a modem, etc., where the CPU mainly handles the operating system, UI, and application programs, etc.; the GPU is responsible for rendering and drawing of contents that needs to be displayed on a touch screen; the NPU is used to realize artificial intelligence (AI) functions; the modem is used to process wireless communication. It can be understood that, the modem may not be integrated into the processor 1310, but may be realized through a single chip.

The memory 1320 may include a random access memory (RAM), and may also include a read-only memory (ROM). Optionally, the memory 1320 includes a non-transitory computer-readable storage medium. The memory 1320 may be used to store instructions, programs, codes, codes sets or instructions sets. The memory 1320 may include a program storage region and a data storage region. The program storage region may store instructions for implementing an operating system, instructions for at least one function (e.g., a touch function, a sound playback function, and an image playback function), instructions for realizing various method implementations, etc. The data storage region may store data created according to use of the wearable device (e.g., audio data and phonebook), etc.

The wearable device of implementations of the disclosure may further include a communication component 1330 and a display component 1340. The communication component 1330 may be a Bluetooth component, a wireless-fidelity (Wi-Fi) component, a near field communication (NFC) component, etc., and is used to communicate with an external device (a server, or other terminal devices) through a wired or wireless network. The display component 1340 is used to display a GUI and/or receive a user interaction operation.

In addition, those skilled in the art can understand that the structure of the wearable device illustrated in the accompanying drawings does not constitute any limitation on the wearable device. The wearable device may include more or fewer components than illustrated, or may combine certain components, or may have different component arrangements. As an example, the wearable device further includes components such as a radio frequency circuit, an input unit, a sensor, an audio circuit, a speaker, a microphone, and a power supply, which will not be repeated herein.

Implementations of the disclosure further provide a non-transitory computer-readable storage medium. The non-transitory computer-readable storage medium stores at least one instruction which, when executed by a processor, is operable to execute the method for system switching provided in the foregoing implementations.

Implementations of the disclosure further provide a computer program product or computer program. The computer program product or computer program includes computer instructions stored in a computer-readable storage medium. A processor of a computer device is configured to read the computer instructions from the computer-readable storage medium, and execute the computer instructions, to make the computer device execute the method for system switching provided in the foregoing implementations.

Those skilled in the art should realize that, in one or more of the foregoing examples, functions described in implementations of the disclosure may be implemented in hardware, software, firmware, or any combination thereof. When implemented in software, the functions may be stored on a computer-readable medium or transmitted as one or more instructions or codes on the computer-readable medium. The computer-readable medium may include a computer storage medium and a communication medium. The communication medium includes any medium that transfers computer programs from one place to another place. The storage medium may be any available medium that can be accessed by a general-purpose or special-purpose computer.

The above merely depicts some exemplary implementations of the disclosure, which however is not intended to limit the disclosure. Any modifications, equivalent substitutions, or improvements made thereto without departing from the spirits and principles of the disclosure shall all be encompassed within the protection of the disclosure.

What is claimed is:

1. A method for system switching, performed by a wearable device at least equipped with a first processor and a second processor, the second processor having higher power consumption than the first processor, the first processor being configured to run a first system and the second processor being configured to run a second system, and the method comprising:
   processing a first event with the first system when the second processor is in a dormant state; and
   switching the second processor to a wake-up state and processing a second event with the second system, in response to the second event being triggered and the first processor failing to meet a processing capacity required for the second event;
   wherein processing the second event with the second system comprises:
      sending event data of the second event to the second system with the first system;
      processing the event data with the second system to obtain event feedback data; and
      receiving the event feedback data sent by the second system with the first system, and displaying, with the first system, a graphical user interface (GUI) corresponding to the second event according to the event feedback data.

2. The method of claim 1, wherein after processing the second event with the second system, the method further comprises:
   switching the second processor to the dormant state, in response to completion of processing of the second event.

3. The method of claim 2, wherein the second system has a GUI display permission in a process of processing the second event;
   before switching the second processor to the dormant state, the method further comprises:
      sending a second switch instruction to the first system with the second system; and
      obtaining the GUI display permission with the first system from the second system in response to the second switch instruction.

4. The method of claim 1, wherein the method further comprises:
   caching first data with the first system when the second processor is in the dormant state, wherein the first data is cached in a data storage space corresponding to the first system; and
   after switching the second processor to the wake-up state, the method further comprises:
   synchronizing the first data to the second system with the first system when the second processor is in the wake-up state.

5. The method of claim 4, wherein synchronizing the first data to the second system with the first system comprises:
   binding, according to a data type of the first data, a data synchronization service through a data communication service provided by the second system, wherein different data types correspond to different data synchronization services; and
   synchronizing the first data to a target application in the second system through the data synchronization service bound, wherein the target application is used to process the first data.

6. The method of claim 5, wherein synchronizing the first data to the second system with the first system further comprises:
   synchronizing target data in the first data to the second system with the first system, wherein a data volume of the target data is less than a data-volume threshold.

7. The method of claim 4, wherein after caching the first data with the first system, the method further comprises:
   switching the second processor to the wake-up state and synchronizing the first data to the second system with the first system, in response to a data volume of the first data cached reaching a storage-capacity threshold.

8. The method of claim 4, wherein after caching the first data with the first system, the method further comprises:
   switching the second processor to the wake-up state and synchronizing instant data to the second system with the first system, in response to the first data cached containing the instant data.

9. The method of claim 4, wherein after caching the first data with the first system, the method further comprises:
   switching the second processor to the wake-up state and synchronizing the first data to the second system with the first system, in response to a data alignment time point being reached.

10. The method of claim 9, wherein switching the second processor to the wake-up state in response to the data alignment time point being reached comprises:
    determining a target data alignment time point corresponding to the first data according to a real-time requirement of the first data, wherein data with different real-time requirements correspond to different data alignment time points, and a time interval between data alignment time points is negatively correlated with the real-time requirement; and
    switching the second processor to the wake-up state in response to the target data alignment time point being reached.

11. The method of claim 4, wherein a communication component is mounted on the first processor, and before synchronizing the first data to the second system with the first system, the method further comprises:
    synchronizing second data to the second system with the first system in response to receiving, by the communication component, the second data sent by an external device, when the second processor is in the wake-up state.

12. The method of claim 1, wherein after processing the second event with the second system, the method further comprises:
    synchronizing third data to the first system through a data communication service provided by the second system, wherein the third data is data generated in a process of processing the second event.

13. The method of claim 1, wherein after processing the second event with the second system, the method further comprises:
    maintaining the second processor in the wake-up state within a dormant delay duration corresponding to the second event in response to completion of processing of the second event, wherein the dormant delay duration is determined according to at least one of a wake-up frequency of the second processor after the second event or an event type of the second event; and switching the second processor to the dormant state and processing the first event with the first system, in response to the dormant delay duration elapsed.

14. The method of claim 1, further comprising:

classifying, according to an application scenario of a triggered event, the triggered event as the first event or the second event, wherein the application scenario comprises a weak interaction scenario and a strong interaction scenario.

15. A wearable device, comprising:

a first processor, configured to run a first system;

a second processor, having higher power consumption than the first processor, and configured to run a second system; and a memory, coupled with the first processor and the second processor, and storing at least one instruction which, when executed by the first processor or the second processor, is operable with the wearable device to:

process a first event with the first system when the second processor is in a dormant state; and switch the second processor to a wake-up state and process a second event with the second system, in response to the second event being triggered and the first processor failing to meet a processing capacity required for the second event;

wherein the wearable device is further configured to:

cache first data with the first system, wherein the first data is cached in a data storage space corresponding to the first system;

wherein after switching the second processor to the wake-up state, the wearable device is further configured to:

synchronize the first data to the second system with the first system when the second processor is in the wake-up state; and wherein after caching the first data with the first system, the wearable device is further configured to:

switch the second processor to the wake-up state and synchronize instant data to the second system with the first system, in response to the first data cached containing the instant data.

16. The wearable device of claim 15, wherein the wearable device configured to process the second event with the second system is configured to:

send a first switch instruction to the first system with the second system;

transfer a graphical user interface (GUI) display permission with the first system to the second system in response to the first switch instruction; and process the second event with the second system, and display a GUI corresponding to the second event.

17. The wearable device of claim 15, wherein the wearable device configured to process the second event with the second system is configured to:

send event data of the second event to the second system with the first system;

process the event data with the second system to obtain event feedback data; and receive the event feedback data sent by the second system with the first system, and display a GUI corresponding to the second event according to the event feedback data.

18. The wearable device of claim 15, wherein after processing the second event with the second system, the wearable device is further configured to:

switch the second processor to the dormant state, in response to completion of processing of the second event.

19. The wearable device of claim 15, wherein after processing the second event with the second system, the wearable device is further configured to:

maintain the second processor in the wake-up state within a dormant delay duration corresponding to the second event in response to completion of processing of the second event, wherein the dormant delay duration is determined according to at least one of a wake-up frequency of the second processor after the second event or an event type of the second event; and switch the second processor to the dormant state and process the first event with the first system, in response to the dormant delay duration elapsed.

20. A non-transitory computer-readable storage medium storing at least one instruction which, when executed by a first processor or a second processor of a wearable device, causes the wearable device to carry out actions, comprising:

processing a first event with a first system when the second processor is in a dormant state, the first processor being configured to run the first system, the second processor being configured to run a second system, and the second processor having higher power consumption than the first processor; and switching the second processor to a wake-up state and processing a second event with the second system, in response to the second event being triggered and the first processor failing to meet a processing capacity required for the second event;

wherein the at least one instruction executed by the first processor or the second processor of the wearable device to carry out the actions of processing the second event with the second system is executed by the first processor or the second processor of the wearable device to carry out actions, comprising:

sending event data of the second event to the second system with the first system;

processing the event data with the second system to obtain event feedback data; and receiving the event feedback data sent by the second system with the first system, and displaying, with the first system, a graphical user interface (GUI) corresponding to the second event according to the event feedback data.

* * * * *